(12) United States Patent
Takeuchi et al.

(10) Patent No.: US 10,074,841 B2
(45) Date of Patent: Sep. 11, 2018

(54) STRUCTURE FOR NON-AQUEOUS ELECTROLYTE SECONDARY BATTERY, NON-AQUEOUS ELECTROLYTE SECONDARY BATTERY, AND METHOD FOR MANUFACTURING SAME STRUCTURE

(71) Applicant: Kureha Corporation, Tokyo (JP)

(72) Inventors: Aya Takeuchi, Tokyo (JP); Yusaku Inaba, Tokyo (JP); Tamito Igarashi, Tokyo (JP); Yoshiyuki Nagasawa, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 14/785,636

(22) PCT Filed: May 12, 2014

(86) PCT No.: PCT/JP2014/062592
§ 371 (c)(1),
(2) Date: Oct. 20, 2015

(87) PCT Pub. No.: WO2014/185378
PCT Pub. Date: Nov. 20, 2014

(65) Prior Publication Data
US 2016/0079582 A1  Mar. 17, 2016

(30) Foreign Application Priority Data
May 15, 2013 (JP) .................................. 2013-102892

(51) Int. Cl.
*H01M 2/16* (2006.01)
*H01M 2/14* (2006.01)
(Continued)

(52) U.S. Cl.
CPC ......... *H01M 2/1686* (2013.01); *H01M 2/145* (2013.01); *H01M 2/1653* (2013.01);
(Continued)

(58) Field of Classification Search
CPC combination set(s) only.
See application file for complete search history.

(56) References Cited

U.S. PATENT DOCUMENTS

2013/0260207 A1* 10/2013 Uemura .................. H01M 2/16
429/144
2014/0242444 A1* 8/2014 Nishikawa .......... H01M 2/0247
429/145
(Continued)

FOREIGN PATENT DOCUMENTS

| JP | 2008014504 A | 2/2008 |
| JP | 2008041504 A | 2/2008 |

(Continued)

OTHER PUBLICATIONS

SF-2751 International Preliminary Report on Patentability for PCT/JP2014/062592 dated Jul. 29, 2014, 6 pages.
(Continued)

*Primary Examiner* — Kaity V Chandler
(74) *Attorney, Agent, or Firm* — Abel Law Group, LLP

(57) ABSTRACT

An object of the present invention is to provide a structure for a non-aqueous electrolyte secondary battery that can be manufactured without going through a complicated process such as passing through a poor solvent. The structure for a non-aqueous electrolyte secondary battery of the present invention comprises a positive electrode, a separator, and a negative electrode, the structure comprising an intermediate layer formed between the positive electrode and the separator and/or between the negative electrode and the separator and including vinylidene fluoride polymer particles consti-
(Continued)

tuting 60 to 100 parts by mass per 100 parts by mass of raw materials that constitute the intermediate layer.

6 Claims, 3 Drawing Sheets

(51) Int. Cl.
*H01M 10/0525* (2010.01)
*H01M 4/13* (2010.01)
*H01M 4/139* (2010.01)
*H01M 10/05* (2010.01)

(52) U.S. Cl.
CPC ............ *H01M 4/13* (2013.01); *H01M 4/139* (2013.01); *H01M 10/05* (2013.01); *H01M 10/0525* (2013.01); *H01M 2220/30* (2013.01)

(56) References Cited

U.S. PATENT DOCUMENTS

| | | | | |
|---|---|---|---|---|
| 2014/0248525 | A1* | 9/2014 | Iwai | H01M 2/1686 429/144 |
| 2014/0272523 | A1* | 9/2014 | Otsuka | H01M 10/052 429/126 |
| 2014/0363726 | A1 | 12/2014 | Honda et al. | |
| 2015/0004464 | A1 | 1/2015 | Okuno et al. | |

FOREIGN PATENT DOCUMENTS

| | | |
|---|---|---|
| JP | 2010092718 A | 4/2010 |
| JP | 2011144245 A | 7/2011 |
| WO | WO2012081543 A1 | 6/2012 |
| WO | 2013058367 A1 | 4/2013 |
| WO | 2013058371 A1 | 4/2013 |
| WO | WO2013058119 A1 | 4/2013 |
| WO | WO2013073503 A1 | 5/2013 |
| WO | WO2013108511 A1 | 7/2013 |
| WO | WO2013133074 A1 | 9/2013 |
| WO | 2013084416 A1 | 4/2015 |

OTHER PUBLICATIONS

International Search Report of PCT/JP2014/062592 dated Jul. 29, 2014.
Office Action with regard to Japanese Patent application No. 3026-517070, dated Mar. 20, 2018 (with translation).
Notification of the First Office Action dated Dec. 25, 2017 with regard to Chinese Application No. 201480012473.1 (with Translation).
Office Action with regard to Japanese Patent application No. 2015-517070, dated Mar. 20, 2018 (with translation).

* cited by examiner

STRUCTURE FOR NON-AQUEOUS ELECTROLYTE SECONDARY BATTERY, NON-AQUEOUS ELECTROLYTE SECONDARY BATTERY, AND METHOD FOR MANUFACTURING SAME STRUCTURE

TECHNICAL FIELD

The present invention relates to a structure for a non-aqueous electrolyte secondary battery, a non-aqueous electrolyte secondary battery, and a method for manufacturing the same structure.

BACKGROUND ART

Recently, electronic technology has been remarkably developed, and various appliances have been made smaller and lighter. Along with the miniaturization and reduction in weight of electronic appliances, miniaturization and reduction in weight of batteries, serving as power sources of these electronic appliances, have been demanded. As batteries that have small volume and mass but are capable of providing large amounts of energy, non-aqueous electrolyte secondary batteries using lithium have been used. In addition, it has been proposed to use non-aqueous electrolyte secondary batteries as energy sources for hybrid cars, electric cars, and the like, and they have started to be put into practical use.

Generally, a non-aqueous electrolyte secondary battery has a positive electrode, a negative electrode, and a separator provided therebetween for insulating the positive electrode and the negative electrode. Conventionally, a porous film of a polyolefin-based polymer has been used as a separator used in a non-aqueous electrolyte secondary battery.

In non-aqueous electrolyte secondary batteries, charging and discharging are possible by ions (in the case of a lithium-ion secondary battery, lithium ions ($Li^+$)) moving between a positive electrode and a negative electrode through a separator. Therefore, the separator is required to not inhibit ions from moving freely, and a porous film having a plurality of microscopic pores has been used as the separator.

In addition, the separator is required to have a so-called shutdown function. The shutdown function is a function that improves safety of the non-aqueous electrolyte secondary battery by, in the case where a tiny short circuit has occurred in the battery, inhibiting the movement of ions by blocking the holes in the part where the short circuit occurred in order to make the battery lose the function at that part. In the porous film of a polyolefin-based polymer, the shutdown function is achieved by, in the case where a tiny short circuit occurred in the battery, melting the part where the short circuit occurred by increasing the temperature and thereby blocking the holes.

However, when the shutdown function occurs, the separator shrinks, and as a result, secondary problems occur, such as the directly opposing positive electrode and negative electrode making contact and forming a short circuit.

A known method to solve such problems is to provide, on at least one face of the separator, a layer using a resin or the like having lower heat resistance than the separator.

For example, it has been proposed to provide, on at least one side of the separator, a surface layer containing polymer particles having a lower melting point than the separator and a binding agent (for example, see Patent Document 1).

Patent Document 1 discloses that due to the surface layer containing polymer particles having a lower melting point than the separator, the polymer particles having a lower melting point than the separator melt before the separator does when the battery internal temperature becomes high, and by forming a film on the separator surface, the pores of the separator, which is a porous film, can be blocked before the separator shrinks.

As another example, it has been proposed to provide a heat-resistant resin porous membrane containing from 0.1 to 5 wt % of fluorine resin microparticles on at least one side of the separator (for example see Patent Document 2).

Patent Document 2 discloses that the heat-resistant resin porous film has excellent abrasion resistance due to containing fluorine resin microparticles.

CITATION LIST

Patent Literature(s)

Patent Document 1: Japanese Unexamined Patent Application Publication No. 2008-41504A
Patent Document 2: Japanese Unexamined Patent Application Publication No. 2010-92718A

SUMMARY OF INVENTION

Technical Problem

A conventionally known method used when providing a layer using a resin on at least one face of a separator requires a porosification process, such as dissolving or dispersing a resin and the like that constitute the layer in a solvent, coating the separator with the resulting solution or dispersion, passing the separator through a poor solvent of the resin that constitutes the layer, and then drying.

An object of the present invention is to provide a structure for a non-aqueous electrolyte secondary battery that can be manufactured without going through a complicated process such as passing the separator through a poor solvent, a method for manufacturing the same, and a non-aqueous electrolyte secondary battery obtained from the structure.

Solution to Problem

As a result of diligent research to achieve the above object, the present inventors discovered that an intermediate layer containing a certain amount of vinylidene fluoride polymer particles comprise electrolyte infusion passages without performing complicated processes such as passing the separator through a poor solvent.

That is, the structure for a non-aqueous electrolyte secondary battery of the present invention comprises a positive electrode, a separator, and a negative electrode, the structure comprising an intermediate layer formed between the positive electrode and the separator and/or between the negative electrode and the separator and including vinylidene fluoride polymer particles constituting 60 to 100 parts by mass per 100 parts by mass of raw materials that constitute the intermediate layer.

The intermediate layer preferably has a structure in which a plurality of vinylidene fluoride polymer particles are mutually joined directly or via a water-soluble polymer.

The average particle size of the vinylidene fluoride polymer particles is preferably from 10 to 700 nm.

The intermediate layer is preferably provided between the positive electrode and the separator.

The non-aqueous electrolyte secondary battery of the present invention is obtained from the structure for the non-aqueous electrolyte secondary battery.

The method for manufacturing a structure for a non-aqueous electrolyte secondary battery of the present invention is a method for manufacturing the above structure for a non-aqueous electrolyte secondary battery, wherein the intermediate layer is formed by any of the following items (1) to (4):

(1) forming the intermediate layer by coating at least one selected from a positive electrode, a separator, and a negative electrode with an aqueous dispersion containing vinylidene fluoride polymer particles, and drying;

(2) forming the intermediate layer by immersing at least one selected from a positive electrode, a separator, and a negative electrode in an aqueous dispersion containing vinylidene fluoride polymer particles, and drying;

(3) forming the intermediate layer by coating a substrate with an aqueous dispersion containing vinylidene fluoride polymer particles, drying, and then peeling from the substrate; and (4) forming the intermediate layer by immersing a substrate in an aqueous dispersion containing vinylidene fluoride polymer particles, drying, and then peeling from the substrate.

Advantageous Effects of Invention

The structure for a non-aqueous electrolyte secondary battery of the present invention is a structure comprising a layer that uses a resin on at least one face of a separator, and can be manufactured by a method simpler than conventional methods.

Thus, the structure for a non-aqueous electrolyte secondary battery and the non-aqueous electrolyte secondary battery of the present invention are superior in productivity.

BRIEF DESCRIPTION OF DRAWING(S)

DESCRIPTION OF EMBODIMENTS

Figure 1:
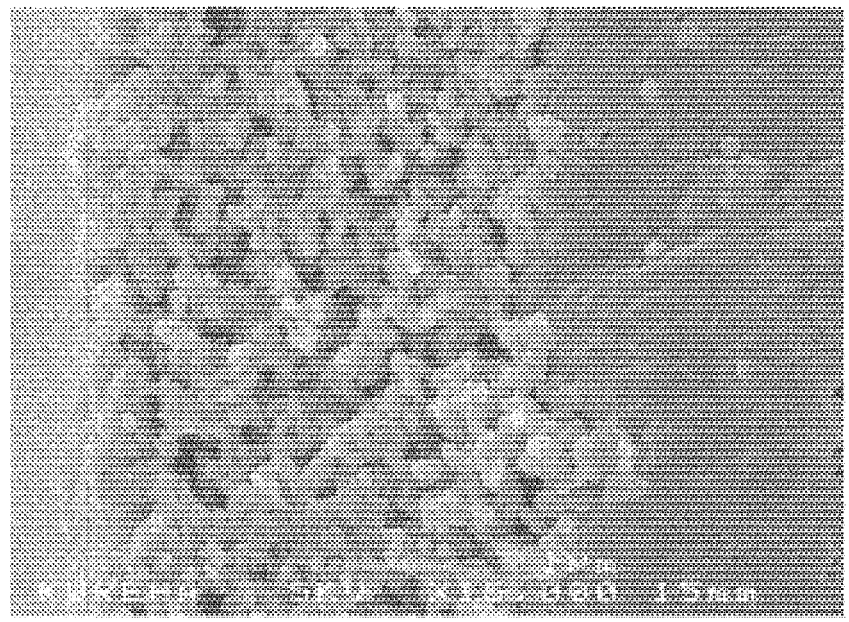
FIG. 1 is an SEM photograph of a cross-section of a separator in which an intermediate layer has been formed, obtained in Experimental Example 1.

The present invention will now be described in detail.

The structure for a non-aqueous electrolyte secondary battery of the present invention comprises a positive electrode, a separator, and a negative electrode, the structure comprising an intermediate layer formed between the positive electrode and the separator and/or between the negative electrode and the separator and including vinylidene fluoride polymer particles constituting 60 to 100 parts by mass per 100 parts by mass of raw materials that constitute the intermediate layer.

The constitution of the structure for a non-aqueous electrolyte secondary battery of the present invention is similar to conventional structures for non-aqueous electrolyte secondary batteries, other than having an intermediate layer formed between a positive electrode and a separator and/or between a negative electrode and the separator and including vinylidene fluoride polymer particles, and the positive electrode, separator, and negative electrode are not particularly limited provided that they are capable of constituting a structure for a non-aqueous electrolyte secondary battery, such as known positive electrodes, separators, and negative electrodes.

Note that, in the present specification, a positive electrode and negative electrode may be comprehensively described as "electrodes", and a positive electrode current collector and negative electrode current collector may be comprehensively described as "current collectors".

Positive Electrode

The positive electrode of the structure for a non-aqueous electrolyte secondary battery of the present invention is not particularly limited provided that the positive electrode contains a positive electrode active material that serves as an instrument for a positive electrode reaction and has a current collecting function; however, in many cases, the positive electrode is composed of a positive electrode mixture layer containing a positive electrode active material and a positive electrode current collector which, in addition to functioning as a current collector, serves to hold the positive electrode mixture layer.

When the structure for a non-aqueous electrolyte secondary battery of the present invention comprises an intermediate layer formed between the positive electrode and the separator and including vinylidene fluoride polymer particles, the intermediate layer is preferably disposed between the positive electrode mixture layer and the separator.

In the present invention, the positive electrode mixture layer contains a positive electrode active material and a binding agent, and, as necessary, the positive electrode mixture layer can further contain a conductivity promoter.

Here, the compounding ratio of the positive electrode active material, the binding agent, and the conductivity promoter in the positive electrode mixture layer may be a compounding ratio generally used in non-aqueous electrolyte secondary batteries such as lithium-ion secondary batteries; however, the compounding ratio may be appropriately adjusted depending on the type of the secondary battery.

The thickness of the positive electrode mixture layer is normally from 20 to 250 µm.

The positive electrode active material used in the non-aqueous electrolyte secondary battery of the present invention is not particularly limited provided that it acts as a positive electrode active material, such as a conventionally known electrode active material for positive electrodes.

Here, if the non-aqueous electrolyte secondary battery is a lithium-ion secondary battery, the positive electrode active material constituting the positive electrode mixture layer is preferably a lithium-based positive electrode active material containing at least lithium.

Examples of the lithium-based positive electrode active material include composite complex metal chalcogen compounds represented by the general formula $LiMY_2$ (M represents at least one type of transition metal such as Co, Ni, Fe, Mn, Cr, and V; Y represents a chalcogen element such as O and S) such as $LiCoO_2$, $LiNi_xCo_{1-x}O_2$ (0 x 1), composite metal oxides having a spinel structure such as $LiMn_2O_4$; olivine-type lithium compounds such as $LiFePO_4$; and the like. Note that a commercially available product may be used as the positive electrode active material.

The specific surface area of the positive electrode active material is preferably from 0.05 to 50 $m^2/g$.

Note that the specific surface area of the positive electrode active material can be determined by the nitrogen adsorption method.

However, the positive electrode active material constituting the non-aqueous electrolyte secondary battery of the present invention is not particularly limited to these, and can be appropriately selected depending on the type of the secondary battery.

In the present invention, the positive electrode mixture layer may further contain a conductivity promoter as necessary. This conductivity promoter is added for the purpose of enhancing the conductivity of the positive electrode mixture layer in the case where an active material having low electrical conductivity such as $LiCoO_2$ is used. As the conductivity promoter, carbonaceous materials such as carbon black and graphite fine powders or fibers, and metal fine powders or fibers such as nickel and aluminum are used.

The binding agent serves a function of binding the positive electrode active material and the conductivity promoter described above.

Here, although the binding agent is not particularly limited, binding agents used widely in conventionally known lithium-ion secondary batteries may be suitably used. As the binding agent, fluorine-containing resins such as polytetrafluoroethylene, polyvinylidene fluoride, and fluororubber, copolymers of styrene-butadiene rubber and carboxymethyl cellulose, thermoplastic resins such as polypropylene and polyethylene, and the like may be used. Furthermore, a vinylidene fluoride copolymer may be used as the fluorine-containing resin. As the vinylidene fluoride copolymer, vinylidene fluoride-monomethylester maleate copolymer and the like may be used.

The positive electrode current collector is not particularly limited provided that the positive electrode current collector has suitable conductivity so that electricity can be supplied to the outside of the secondary battery, and does not inhibit the electrode reaction of the secondary battery.

Examples of the positive electrode current collector include current collectors that are generally used as positive electrode current collectors for non-aqueous electrolyte secondary batteries such as lithium-ion secondary batteries.

For cases where the non-aqueous electrolyte secondary battery is a lithium-ion secondary battery, the positive electrode current collector is preferably a positive electrode current collector formed from aluminum or alloys of aluminum, and of these, a positive electrode current collector formed from aluminum foil is preferable. The current collector is not limited to these, and can be appropriately selected depending on the type of the secondary battery. The thickness of the positive electrode current collector is normally from 5 to 100 μm.

Although the method for manufacturing a positive electrode formed from a positive electrode current collector and a positive electrode mixture layer that can be used in the present invention is not particularly limited, the positive electrode can be obtained by coating the positive electrode mixture containing each component constituting the positive electrode mixture layer onto the current collector and drying.

When preparing the positive electrode mixture, the order of compounding is not particularly limited provided that the positive electrode active material, the binding agent, the conductivity promoter added as necessary, and the non-aqueous solvent are mixed into a uniform slurry.

As the non-aqueous solvent that is used to disperse the positive electrode active material, conductivity promoter, and binding agent, for example, N-methyl-2-pyrrolidone and the like can be used.

Although the positive electrode used in the present invention is manufactured by coating the positive electrode mixture onto the current collector and drying, the coating of the positive electrode mixture is performed on at least one side of the current collector, and preferably performed on both sides. The method of coating the positive electrode mixture is not particularly limited, and examples of the method include methods of coating the positive electrode mixture using a bar coater, die coater, comma coater, or the like.

Furthermore, the drying that is performed after coating is normally performed at a temperature of 50 to 150° C. for 1 to 300 minutes. Furthermore, the pressure at the drying is not particularly limited; however, normally, the drying is performed under atmospheric pressure or reduced pressure. Note that heat treatment can be further performed after the drying. Furthermore, instead of the heat treatment or after the heat treatment, pressing treatment can be further performed. When pressing treatment is performed, the pressing treatment is normally performed at 1 to 200 MPa-G. Performing the pressing treatment is preferable since the electrode density can be enhanced.

Separator

The separator of the structure for a non-aqueous electrolyte secondary battery of the present invention is not particularly limited.

The separator used in the present invention is a separator that constitutes a structure for a non-aqueous electrolyte secondary battery and that serves a function of electrically insulating a positive electrode and a negative electrode and holding an electrolyte solution in the non-aqueous electrolyte secondary battery obtained from the structure. The separator used in the present invention is not particularly limited, and examples of the separator include polyolefin-based polymers such as polyethylene and polypropylene, polyester-based polymers such as polyethylene terephthalate, aromatic polyamide-based polymers, polyimide-based polymers such as polyether imide, polyether sulfone, polysulfone, polyether ketone, polystyrene, polyethylene oxide, polycarbonate, polyvinyl chloride, polyacrylonitrile, polymethyl methacrylate, ceramics, and the like, and monolayer and multilayer porous films, nonwoven fabric, glass, paper, or the like that is formed from a mixture thereof, and the like. Note that modified polymers may be used as the polymers.

In particular, a porous film of polyolefin-based polymer (e.g., polyethylene, polypropylene) is preferably used. Examples of the polyolefin-based polymer porous film include monolayer polypropylene separators, monolayer polyethylene separators, and trilayer polypropylene/polyethylene/polypropylene separators that are commercially available as Celgard (registered trademark) from Polypore International, Inc., and the like. Note that surface treatment may be performed as the separator.

Note that, in order to assure insulation between the positive electrode and the negative electrode, the separator is preferably larger than the positive electrode and the negative electrode.

Negative Electrode

The negative electrode of the structure for a non-aqueous electrolyte secondary battery of the present invention is not particularly limited provided that the negative electrode contains a negative electrode active material that serves as an instrument for a negative electrode reaction and has a current collecting function; however, in many cases, the negative electrode is composed of a negative electrode mixture layer containing a negative electrode active material and a negative electrode current collector which, in addition to functioning as a current collector, serves to hold the negative electrode mixture layer.

When the structure for a non-aqueous electrolyte secondary battery of the present invention comprises an intermediate layer formed between the negative electrode and the separator and including vinylidene fluoride polymer particles, the intermediate layer is preferably disposed between the negative electrode mixture layer and the separator.

In the present invention, the negative electrode mixture layer contains a negative electrode active material and a binding agent, and, as necessary, the negative electrode mixture layer may further contain a conductivity promoter.

Here, the compounding ratio of the negative electrode active material, the binding agent, and the conductivity promoter in the negative electrode mixture layer may be a compounding ratio generally used in non-aqueous electrolyte secondary batteries such as lithium-ion secondary batteries; however, the compounding ratio may be appropriately adjusted depending on the type of the secondary battery.

The thickness of the negative electrode mixture layer is normally from 20 to 250 μm.

The negative electrode active material used in the non-aqueous electrolyte secondary battery of the present invention is not particularly limited provided that it acts as a negative electrode active material, such as a conventionally known electrode active material for negative electrodes.

Here, examples of the negative electrode active material constituting the negative electrode mixture layer include carbon materials, metal/alloy materials, metal oxides, and the like. Of these, carbon materials are preferable.

As the carbon material, artificial graphite, natural graphite, non-graphitizable carbon, graphitizable carbon, or the like is used. Furthermore, the carbon material may be used alone or in a combination of two or more types thereof.

When such a carbon material is used, the energy density of the battery can be increased.

The artificial graphite can be obtained by, for example, carbonizing an organic material, performing heat treatment on the material at higher temperature, and crushing and sieving the material. The non-graphitizable carbon can be obtained by, for example, calcining a material derived from petroleum pitch at 1000 to 1500° C.

Note that a commercially available product may be used as these negative electrode active materials.

The specific surface area of the negative electrode active material is preferably from 0.3 to 10 m$^2$/g. If the specific surface area exceeds 10 m$^2$/g, decomposed amount of the electrolyte solution may increase thereby increasing the initial irreversible capacity.

Note that the specific surface area of the negative electrode active material can be determined by the nitrogen adsorption method.

However, the negative electrode active material constituting the non-aqueous electrolyte secondary battery of the present invention is not particularly limited to these, and can be appropriately selected depending on the type of the secondary battery.

In the present invention, the negative electrode mixture layer may further contain a conductivity promoter as necessary. This conductivity promoter is added for the purpose of enhancing the conductivity of the negative electrode mixture layer. As the conductivity promoter, carbonaceous materials such as carbon black and graphite fine powders or fibers, and metal fine powders or fibers such as nickel and aluminum are used.

The binding agent serves a function of binding the negative electrode active material and the conductivity promoter described above.

Here, the binding agent is the same as the binding agent described in the "Positive electrode" paragraph above.

The negative electrode current collector is not particularly limited provided that the negative electrode current collector has suitable conductivity so that the electricity can be supplied to the outside of the secondary battery, and does not inhibit the electrode reaction of the secondary battery.

Examples of the negative electrode current collector include current collectors that are generally used as negative electrode current collectors for non-aqueous electrolyte secondary batteries such as lithium-ion secondary batteries.

The negative electrode current collector is preferably a negative electrode current collector formed from copper, and of these, a negative electrode current collector formed from copper foil is preferable. The negative electrode current collector is not limited to these, and can be appropriately selected depending on the type of the secondary battery. The thickness of the negative electrode current collector is normally from 5 to 100 μm.

Although the method for manufacturing a negative electrode formed from a negative electrode current collector and a negative electrode mixture layer that can be used in the present invention is not particularly limited, the negative electrode can be obtained by coating the negative electrode mixture containing each component constituting the negative electrode mixture layer onto the current collector and drying.

As the method for preparing the negative electrode mixture and the method for manufacturing the negative electrode, the same method as that for preparing the positive electrode mixture and the method for manufacturing the positive electrode as described in the "positive electrode" paragraph above may be used.

Intermediate Layer Formed Including Vinylidene Fluoride Polymer Particles

The structure for a non-aqueous electrolyte secondary battery of the present invention comprises an intermediate layer formed between the positive electrode and the separator and/or between the negative electrode and the separator and including vinylidene fluoride polymer particles.

The structure for a non-aqueous electrolyte secondary battery of the present invention comprises an intermediate layer formed between the positive electrode and the separator and/or between the negative electrode and the separator and including vinylidene fluoride polymer particles, but it is preferred that the structure be provided between the positive electrode and the separator and not between the negative electrode and the separator, or be provided between the positive electrode and the separator and between the negative electrode and the separator, and it is more preferred that the structure be provided between the positive electrode and the separator and between the negative electrode and the separator. That is, the structure for a non-aqueous electrolyte secondary battery of the present invention preferably comprises an intermediate layer formed at least between the positive electrode and the separator and including vinylidene fluoride polymer particles. It is preferred that the structure for a non-aqueous electrolyte secondary battery of the present invention comprise an intermediate layer formed at least between the positive electrode and the separator and including vinylidene fluoride polymer particles because resistance to oxidation and reduction of the separator is enhanced.

The vinylidene fluoride polymer particles are particles formed including a vinylidene fluoride polymer, and the vinylidene fluoride polymer may be either a vinylidene fluoride homopolymer or a vinylidene fluoride copolymer. Furthermore, the vinylidene fluoride polymer particles used in the present invention may be formed from a mixture of vinylidene fluoride polymers, or a plurality of types of vinylidene fluoride polymer particles may be used.

When the vinylidene fluoride polymer is a vinylidene fluoride copolymer, the monomer other than the vinylidene fluoride that constitutes that copolymer (also referred to as "other monomer" hereinafter) is not particularly limited, but examples include fluorine-based monomers, hydrocarbon monomers such as ethylene and propylene, carboxyl group-containing monomers, and carboxylic acid anhydride-containing monomers capable of copolymerizing with vinylidene fluoride. Furthermore, the other monomer may be one type used alone or two or more types.

When the vinylidene fluoride polymer is a vinylidene fluoride copolymer, if the total of monomer used as a raw material is taken as 100 mol %, vinylidene fluoride is normally used in an amount of not less than 50 mol %, and preferably not less than 80 mol %, more preferably not less than 85 mol %, and most preferably not less than 90 mol %. The other monomer is normally used in an amount of not greater than 50 mol %, and preferably not greater than 20 mol %, more preferably not greater than 15 mol %, and most preferably not greater than 10 mol %. When the vinylidene fluoride polymer is a vinylidene fluoride copolymer, it is preferable that the properties derived from the other monomer manifest themselves, and it is preferable that vinylidene fluoride is used in an amount of not greater than 95 mol % and the other monomer not less than 5 mol %.

Examples of the fluorine-based monomer that is copolymerizable with vinylidene fluoride include vinyl fluoride, trifluoroethylene (TrFE), tetrafluoroethylene (TFE), chlorotrifluoroethylene (CTFE), hexafluoropropylene (HFP), perfluoroalkylvinylethers exemplified by perfluoromethylvinylether, and the like.

As the carboxyl group-containing monomer, an unsaturated monobasic acid, unsaturated dibasic acid, monoester of an unsaturated dibasic acid, and the like are preferred.

Examples of the unsaturated monobasic acid include acrylic acid, methacrylic acid, 2-carboxyethyl acrylate, 2-carboxyethyl methacrylate, and the like. Examples of the unsaturated dibasic acid include maleic acid, citraconic acid, and the like. The monoester of an unsaturated dibasic acid preferably has from 5 to 8 carbons, and examples include maleic acid monomethyl ester, maleic acid monoethyl ester, citraconic acid monomethyl ester, citraconic acid monoethyl ester, and the like. Among these, acrylic acid, methacrylic acid, maleic acid, citraconic acid, maleic acid monomethyl ester, and citraconic acid monomethyl ester are preferred as the carboxyl group-containing monomer. Furthermore, as the carboxyl group-containing monomer, acryloyloxyethyl succinic acid, methacryloyloxyethyl succinic acid, acryloyloxyethyl phthalic acid, methacryloyloxyethyl phthalic acid, and the like may be used.

Examples of the carboxylic acid anhydride-containing monomer include acid anhydrides of the unsaturated dibasic acids, specifically maleic acid anhydride and citraconic acid anhydride.

Furthermore, the vinylidene fluoride polymer used in the present invention may be a crosslinked polymer. When the vinylidene fluoride polymer is a crosslinked polymer, a polyfunctional monomer may be used as the other monomer, and after an uncrosslinked polymer is obtained, a crosslinking reaction may be performed using a polyfunctional monomer.

As the vinylidene fluoride copolymer, a copolymer of vinylidene fluoride and a fluorine-based monomer capable of copolymerizing with vinylidene fluoride is preferred. Specifically, vinylidene fluoride (VDF)-TFE copolymer, VDF-TFE-HFP copolymer, VDF-HFP copolymer, VDF-CTFE copolymer, VDF-TFE-CTFE copolymer, and VDF-HFP-CTFE copolymer are preferred, and VDF-TFE-HFP copolymer, VDF-HFP copolymer, VDF-CTFE copolymer, and VDF-HFP-CTFE copolymer are more preferred.

The vinylidene fluoride polymer may be a vinylidene fluoride homopolymer or may be a vinylidene fluoride copolymer as described above, but it is preferably a vinylidene fluoride copolymer because it results in excellent adhesion strength between the separator and the intermediate layer and excellent adhesion strength between the electrodes and the intermediate layer when a non-aqueous electrolyte secondary battery is manufactured from the structure for a non-aqueous electrolyte secondary battery of the present invention.

The method for obtaining the vinylidene fluoride polymer is not particularly limited, but may be a polymerization method such as, for example, emulsion polymerization, soap-free emulsion polymerization, mini-emulsion polymerization, suspension polymerization, solution polymerization, or bulk polymerization. Among these methods, a manufacturing method by which the vinylidene fluoride polymer can be obtained as particles is preferred. When the vinylidene fluoride polymer is obtained in a form other than particles, treatment such as milling is required in order to use it as vinylidene fluoride polymer particles, and therefore it is preferable to employ a method by which particulate vinylidene fluoride polymer, i.e., vinylidene fluoride polymer particles, can be obtained.

Examples of the method for obtaining vinylidene fluoride polymer particles include emulsion polymerization, soap-free emulsion polymerization, mini-emulsion polymerization, and suspension polymerization, but emulsion polymerization, soap-free emulsion polymerization, and mini-emulsion polymerization, by which it is easy to obtain vinylidene fluoride polymer particles having an average particle size of not greater than 1 µm, are preferred.

Emulsion polymerization is a method for obtaining vinylidene fluoride polymer particles using a monomer, an emulsifier, water, and a polymerization initiator. As the emulsifier, an ionic emulsifier, a nonionic emulsifier, or the like may be used provided that it is capable of forming micelles and stably dispersing the produced vinylidene fluoride polymer particles. As the polymerization initiator, a water-soluble peroxide or a water-soluble azo compound may be used, or a redox initiator such as ascorbic acid-hydrogen peroxide may be used.

Soap-free emulsion polymerization is emulsion polymerization performed without using an emulsifier normally used when performing the emulsion polymerization described above. Vinylidene fluoride copolymer particles obtained by soap-free emulsion polymerization are preferred because there is no bleed-out of emulsifier on the surface when an intermediate layer formed including the vinylidene fluoride copolymer particles is formed, because the emulsifier does not remain in the polymer particles. Soap-free emulsion polymerization can be performed by changing the emulsifier in the emulsion polymerization to a reactive emulsifier. Furthermore, when the monomer is dispersed, soap-free polymerization can be performed without using a reactive emulsifier.

Note that a reactive emulsifier is a substance that has a polymeric double bond in the molecule and acts as an emulsifier. When a reactive emulsifier is used, micelles are formed similar to when the emulsifier is present in the system in the initial stage of polymerization, but as the reaction proceeds, the reactive emulsifier is consumed as a monomer, resulting in nearly no reactive emulsifier being present in the free state in the reaction system.

Mini-emulsion polymerization is a method for performing polymerization by reducing the size of monomer droplets to sub-micron size by applying strong shear force using an ultrasonic generator or the like. Mini-emulsion polymerization is performed by adding a hardly-soluble substance such as a hydrophobe in order to stabilize the miniaturized monomer oil droplets. In mini-emulsion polymerization, ideally, monomer oil droplets are polymerized, and each oil droplet changes into a vinylidene fluoride polymer microparticle.

Suspension polymerization is a method for performing polymerization by dissolving a water-insoluble polymerization initiator in a water-insoluble monomer and suspending it in water by mechanical agitation while heating. In suspension polymerization, polymerization proceeds in the monomer droplets and a dispersion of vinylidene fluoride polymer microparticles is obtained. The particle size of the polymer microparticles obtained by suspension polymerization generally tends to be larger than the particle size of the polymer microparticles obtained by emulsion polymerization, soap-free emulsion polymerization, or mini-emulsion polymerization, but vinylidene fluoride polymer particles of small particle size can be obtained by performing agitation accompanied by high-speed shearing in the mechanical agitation, making the monomer droplets very fine, and stabilizing the fine monomer droplets by optimizing the dispersion stabilizer.

The emulsifier (also referred to as "surfactant" hereinafter) or dispersant used when manufacturing the vinylidene fluoride polymer or dispersing the particles obtained by suspension polymerization or the like in water is preferably resistant to oxidation and reduction, considering that it resides inside the battery.

The surfactant may be a nonionic surfactant, a cationic surfactant, an anionic surfactant or an amphoteric surfactant, or a plurality of types may be used.

As the surfactant used in polymerization, conventionally used perfluorinated, partially fluorinated, non-fluorinated surfactants, and the like may be advantageously used in polymerization of polyvinylidene fluoride. Among these, perfluoroalkylsulfonic acids and salts thereof, perfluoroalkylcarboxylic acids and salts thereof, or fluorine-based surfactants having a fluorocarbon chain or fluoropolyether chain are preferably used, and perfluoroalkylcarboxylic acids and salts thereof are more preferably used.

Examples of the reactive emulsifier include polyoxyalkylene alkenyl ethers, sodium alkyl allyl sulfosuccinates, methacryloyloxy polyoxypropylene sodium sulfate esters, alkoxy polyethylene glycol methacrylates and the like, but are not limited thereto.

The polymerization conditions such as the polymerization temperature when performing the polymerization methods described above may be optionally set.

The average particle size of the vinylidene fluoride polymer particles used in the present invention is preferably from 10 to 700 nm, and more preferably from 20 to 500 nm. These ranges are preferred because layer thickness and air permeability can be easily controlled. The average particle size is the cumulant average particle size determined by dynamic light scattering, and can be measured using, for example, ELSZ-2 (manufactured by Otsuka Electronics Co., Ltd.).

The intermediate layer formed including vinylidene fluoride polymer particles of the structure for a non-aqueous electrolyte secondary battery of the present invention may be formed from the vinylidene fluoride polymer particles alone, but are normally formed from these polymer particles and other components (referred to as "other components" hereinafter).

Examples of the other components include water-soluble polymers, inorganic fillers, organic fillers, and the like, but the use of a water-soluble polymer is preferred from the perspectives of adhesion between the intermediate layer and the separator, adhesion between the intermediate layer and the electrodes, and adhesion between vinylidene fluoride polymer particles that contact each other.

As the water-soluble polymer, a polymer that is adhesive to the vinylidene fluoride polymer particles, electrodes and separator is preferred.

Examples of the water-soluble polymer include carboxymethyl cellulose (CMC), polyacrylic acid (PAA), polyvinylpyrrolidone (PVP), polyvinyl alcohol (PVA), polyethylene oxide (PEO), and the like. Carboxymethyl cellulose (CMC) and polyvinyl alcohol (PVA) and the like are preferred from the perspective of long-term battery use.

As the inorganic filler, conventional inorganic fillers used when providing a resin film (intermediate layer) between a positive electrode or negative electrode and a separator in a non-aqueous electrolyte secondary battery may be used without limitation.

Examples of the inorganic filler include oxides such as silicon dioxide ($SiO_2$), alumina ($Al_2O_3$), titanium dioxide ($TiO_2$), calcium oxide (CaO), strontium oxide (SrO), barium oxide (BaO), magnesium oxide (MgO), zinc oxide (ZnO), and barium titanate ($BaTiO_3$); hydroxides such as magnesium hydroxide ($Mg(OH)_2$), calcium hydroxide ($Ca(OH)_2$), zinc hydroxide ($Zn(OH)_2$), and aluminum hydroxide ($Al(OH)_3$); carbonates such as calcium carbonate ($CaCO_3$); sulfates such as barium sulfate; nitrides; clay minerals; and the like. The inorganic filler may be used alone or in a combination of two or more types thereof.

The inorganic filler is preferably alumina, silicon dioxide, magnesium oxide, or zinc oxide from the perspectives of safety of the battery and stability of the coating liquid.

The average particle size of the inorganic filler is preferably from 5 nm to 2 μm, and more preferably from 10 nm to 1 μm.

A commercially available product may be used as the inorganic filler used in the present invention. For example, commercially available high-purity alumina particles such as AKP3000 (manufactured by Sumitomo Chemical Co., Ltd.) may be used.

In the intermediate layer of the structure for a non-aqueous electrolyte secondary battery of the present invention, the vinylidene fluoride polymer particles constitute 60 to 100 parts by mass per 100 parts by mass of raw materials that constitute the intermediate layer.

The amount of vinylidene fluoride polymer particles per 100 parts by mass of raw materials that constitute the intermediate layer is preferably from 65 to 100 parts by mass, and more preferably from 70 to 100 parts by mass.

As the intermediate layer of the non-aqueous electrolyte secondary battery of the present invention, an intermediate layer having air permeability can be formed even without using an inorganic filler by using particulate vinylidene fluoride polymer. When an inorganic filler is not used, it is possible to reduce abrasion of the manufacturing equipment by the organic filler when forming the intermediate layer, and to improve specific energy density of the obtained non-aqueous electrolyte secondary battery. When an inorganic filler is used, short circuiting can be prevented by the presence of the inorganic filler in the intermediate layer even when exposed to high temperature such that the separator or the vinylidene fluoride polymer particles that form the intermediate layer melt in the obtained non-aqueous electrolyte secondary battery.

Furthermore, when a water-soluble polymer is used as a raw material that constitutes the intermediate layer, the water-soluble polymer is normally contained in an amount from 0.01 to 20 parts by mass, preferably from 0.01 to 15 parts by mass, and particularly preferably from 0.01 to 10 parts by mass per 100 parts by mass of raw material.

When an inorganic filler is used as a raw material that constitutes the intermediate layer, the inorganic filler is normally contained in an amount from 0.01 to 40 parts by mass, preferably from 0.01 to 35 parts by mass, and particularly preferably from 0.01 to 30 parts by mass per 100 parts by mass of raw material.

The thickness of the intermediate layer is normally from 0.5 to 25 µm, and preferably from 1 to 20 µm.

The intermediate layer is formed using mainly vinylidene fluoride polymer particles as a raw material. In the intermediate layer, when observed by SEM, the vinylidene fluoride polymer particles are normally present in a state where they retain a particulate form. That is, in the structure for a non-aqueous electrolyte secondary battery of the present invention, the vinylidene fluoride polymer particles that constitute the intermediate layer normally do not melt and unify. The intermediate layer preferably has a structure in which a plurality of vinylidene fluoride polymer particles are mutually joined directly or via a water-soluble polymer. Furthermore, the vinylidene fluoride polymer particles do not have to be joined to each other or joined by a water-soluble polymer when in the state of the structure for a non-aqueous electrolyte secondary battery of the present invention, and may be joined by means of the particle surfaces dissolving or swelling due to the electrolyte infused when the non-aqueous electrolyte secondary battery is manufactured from the structure for the non-aqueous electrolyte secondary battery.

When polymer particles that are adhesive are used as the vinylidene fluoride polymer particles or when heat treatment is performed under conditions where the particle surface vicinity melts in the course of forming the intermediate layer, the intermediate layer preferably has a structure in which the polymer particles join directly to each other. In this structure, each of the particles can be observed by SEM or the like, but the polymer particles have been unified by directly joining to each other.

When polymer particles that are not adhesive are used as the vinylidene fluoride polymer particles or when heat treatment is not performed in the course of forming the intermediate layer, the intermediate layer preferably has a structure in which the polymer particles contact each other and are joined by a water-soluble polymer. This structure is formed by manufacturing the intermediate layer using a liquid that contains the polymer particles, water-soluble polymer, and the like. In this structure, each of the particles can be observed by SEM or the like, and water-soluble polymer is present between each of the particles.

The intermediate layer is normally formed using an aqueous dispersion containing vinylidene fluoride polymer particles. The aqueous dispersion containing vinylidene fluoride polymer particles contains the vinylidene fluoride polymer particles and, as necessary, may contain the other components described above. Note that in the aqueous dispersion, the vinylidene fluoride polymer particles are normally present in the dispersed state, and the other components may be dissolved or dispersed. When another component is a water-soluble polymer, it is normally dissolved, and when an inorganic filler is used as another component, it is dispersed. Note that when including components having a high specific gravity such as inorganic fillers, the aqueous dispersion is preferably used in forming the intermediate layer quickly after being prepared or is re-dispersed beforehand.

Furthermore, in the aqueous dispersion containing vinylidene fluoride polymer particles, the water that is the dispersion medium is normally used in the range of 30 to 99 parts by mass, and preferably from 35 to 98 parts by mass, per 100 parts by mass of the entire dispersion.

The intermediate layer may be formed by any of the following items (1) to (4):

(1) forming the intermediate layer by coating at least one selected from a positive electrode, a separator, and a negative electrode with an aqueous dispersion containing vinylidene fluoride polymer particles, and drying;

(2) forming the intermediate layer by immersing at least one selected from a positive electrode, a separator, and a negative electrode in an aqueous dispersion containing vinylidene fluoride polymer particles, and drying;

(3) forming the intermediate layer by coating a substrate with an aqueous dispersion containing vinylidene fluoride polymer particles, drying, and then peeling the substrate; or (4) forming the intermediate layer by immersing a substrate in an aqueous dispersion containing vinylidene fluoride polymer particles, drying, and then peeling the substrate.

When the aqueous dispersion containing vinylidene fluoride polymer particles is coated onto a positive electrode, a separator, a negative electrode, or a substrate, it may be coated onto at least one face, either on one face or both faces.

Also, heat treatment may be performed as necessary after drying. Note that when a water-soluble polymer is not used as another component, heat treatment is preferably performed.

As the substrate, a substrate made of polyethylene terephthalate (PET) may be used.

When an intermediate layer obtained by peeling from a substrate is used in the present invention, the intermediate layer is used by peeling it from the substrate and then disposing it between the positive electrode and the separator or between the negative electrode and the separator.

The applied temperature and time used when drying differ depending on the system because the melting points and decomposition temperatures of the separator, electrodes, substrate, vinylidene fluoride polymer particles, and other components must be taken into consideration, but the temperature is normally from 40 to 190° C. and preferably from 50 to 180° C., and the time of drying is normally from 1 minute to 15 hours.

Furthermore, the applied temperature and time used when performing heat treatment differ depending on the system because the melting points and decomposition temperatures of the separator, electrodes, substrate, vinylidene fluoride polymer particles, and other components must be taken into consideration, but the temperature is normally from 60 to 220° C. and preferably from 65 to 215° C. The time of heat treatment is normally from 1 minute to 5 hours.

There is a partial overlap in the conditions such as temperature of drying and heat treatment, but the two processes can be performed continuously without the need for a clear distinction between the two.

Structure for Non-aqueous Electrolyte Secondary Battery

As described above, the structure for a non-aqueous electrolyte secondary battery of the present invention comprises a positive electrode, a separator, and a negative electrode, the structure comprising an intermediate layer formed between the positive electrode and the separator and/or between the negative electrode and the separator and including vinylidene fluoride polymer particles constituting 60 to 100 parts by mass per 100 parts by mass of raw materials that constitute the intermediate layer.

The method for manufacturing the structure for a non-aqueous electrolyte secondary battery of the present invention is similar to conventional methods other than including a process for providing an intermediate layer of the present invention between the positive electrode and the separator and/or between the negative electrode and the separator. The method for manufacturing the structure for a non-aqueous electrolyte secondary battery of the present invention is characterized in that, normally, the intermediate layer is formed by any of items (1) to (4) as described above.

When the intermediate layer is formed on the separator or an electrode, the structure for a non-aqueous electrolyte secondary battery of the present invention can be manufactured by a method similar to conventional methods other than using a separator or an electrode on which the intermediate layer has been formed. When the intermediate layer is formed by peeling from a substrate, the structure for a non-aqueous electrolyte secondary battery of the present invention can be manufactured by a method similar to conventional methods other than requiring a process of disposing the intermediate layer between the positive electrode and the separator or the negative electrode and the separator.

The structure for a non-aqueous electrolyte secondary battery of the present invention is preferable because electrolyte infusion passages can be created in the intermediate layer without performing a porosification process because the intermediate layer is formed including vinylidene fluoride polymer particles.

Conventionally known methods used when providing a layer using resin on at least one face of a separator have required a porosification process, such as dissolving or dispersing the resin and the like that constitute the layer in a solvent, and after coating it onto the separator, passing the separator through a poor solvent of the resin that constitutes the layer, and then drying. However, the structure for a non-aqueous electrolyte secondary battery of the present invention can be formed without going through a complicated process such as passing the intermediate layer through a poor solvent.

Thus, the structure for a non-aqueous electrolyte secondary battery and the non-aqueous electrolyte secondary battery of the present invention described below are superior in productivity.

Non-aqueous Electrolyte Secondary Battery

The non-aqueous electrolyte secondary battery of the present invention is obtained from the structure for a non-aqueous electrolyte secondary battery.

Furthermore, the non-aqueous electrolyte secondary battery can have a known battery structure such as a coin-type battery, button-type battery, cylinder-type battery, or square-type battery structure.

Examples of the members that constitute the non-aqueous electrolyte secondary battery other than the structure for a non-aqueous electrolyte secondary battery include a non-aqueous electrolyte solution, a cylindrical case, a laminated pouch, and the like.

The non-aqueous electrolyte solution is a solution formed by dissolving an electrolyte in a non-aqueous solvent.

Examples of the non-aqueous solvent include aprotic organic solvents that can transport cations and anions constituting the electrolyte, and that do not substantially impair the function of the secondary battery. Examples of such a non-aqueous solvent include organic solvents that are generally used in a non-aqueous electrolyte solution for lithium-ion secondary batteries, and for example, carbonates, halogenated hydrocarbons, ethers, ketones, nitriles, lactones, esters, oxolane compounds, and the like can be used. Of these, propylene carbonate, ethylene carbonate, dimethyl carbonate, diethyl carbonate, ethylmethyl carbonate, 1,2-dimethoxyethane, 1,2-diethoxyethane, tetrahydrofuran, □-butyrolactone, methyl propionate, ethyl propionate, and the like are preferable. These non-aqueous solvent may be used alone or in a combination of two or more types thereof.

Furthermore, the types of the electrolyte is not particularly limited provided that the electrolyte is an electrolyte in which the constituent cations and anions can be transported by the non-aqueous solvent, and that does not substantially impair the function of the secondary battery. Here, examples of the electrolyte that can be used for cases where the non-aqueous electrolyte secondary battery is a lithium-ion secondary battery include lithium salts of a fluoro complex anion such as $LiPF_6$, $LiAsF_6$, and $LiBF_4$; inorganic lithium salts such as $LiClO_4$, $LiCl$, and $LiBr$; and lithium salts of sulfonic acid such as $LiCH_3SO_3$ and $LiCF_3SO_3$; and organic lithium salts such as $Li(CF_3OSO_2)_2N$, $Li(CF_3OSO_2)_3C$, $Li(CF_3SO_2)_2N$, and $Li(CF_3SO_2)_3C$. These electrolytes may be used alone or in a combination of two or more types thereof.

The non-aqueous electrolyte secondary battery of the present invention is obtained from the structure for a non-aqueous electrolyte secondary battery described above, but there are also cases where the intermediate layer of the structure for a non-aqueous electrolyte secondary battery swells due to electrolyte infused when the battery is manufactured, and acts as a gel electrolyte. There is a tendency for the intermediate layer to act as a gel electrolyte when the non-aqueous electrolyte secondary battery is obtained particularly when a polymer such as VDF-HFP copolymer or VDF-CTFE copolymer that readily swells due to an electrolyte, is used as the vinylidene fluoride polymer.

WORKING EXAMPLES

The present invention will now be described in further detail with reference to examples, but the present invention is not limited by these working examples.

The moisture content of CMC determined by drying a carboxymethyl cellulose (CMC) used in the production examples (Cellogen 4H, manufactured by Dai-ichi Kogyo Seiyaku Co., Ltd.) at 130° C. for 30 minutes and measuring the weight before and after drying was 7.9%.

The moisture content of CMC determined by drying a CMC used in the production examples (Cellogen PR, manufactured by Dai-ichi Kogyo Seiyaku Co., Ltd.) at 130° C. for 30 minutes and measuring the weight before and after drying was 10.8%.

Production Example 1

Production of CMC 1.5 wt % Aqueous Solution

In an Erlenmeyer flask, 1.0 g of 5% ammonium water and 3.8 g of carboxymethyl cellulose (CMC) (Cellogen 4H, manufactured by Dai-ichi Kogyo Seiyaku Co., Ltd.) were added to 196.0 g of water and heated to dissolve, and CMC aqueous solution 1-1 was obtained.

Another 35 g of water was added to the obtained CMC aqueous solution 1-1, and CMC aqueous solution 1-2 was obtained.

Some of CMC aqueous solution 1-2 was dried at 150° C. for 2 hours, and when the CMC concentration of CMC aqueous solution 1-2 was determined from the weight of the CMC after drying and the weight of the dried CMC aqueous solution 1-2, the CMC concentration was 1.5 wt %.

Production Example 2

Production of CMC 3.5 wt % Aqueous Solution

In an Erlenmeyer flask, 1.0 g of 5% ammonium water and 9.1 g of (CMC) (Cellogen PR, manufactured by Dai-ichi Kogyo Seiyaku Co., Ltd.) were added to 190.0 g of water and heated to dissolve, and CMC aqueous solution 2-1 was obtained.

Another 31 g of water was added to the obtained CMC aqueous solution 2-1, and CMC aqueous solution 2-2 was obtained.

Some of CMC aqueous solution 2-2 was dried at 150° C. for 2 hours, and when the CMC concentration of CMC aqueous solution 2-2 was determined from the weight of the CMC after drying and the weight of the dried CMC aqueous solution 2-2, the CMC concentration was 3.5 wt %.

Production Example 3

Production of PVA 24.3 wt % Aqueous Solution

In an Erlenmeyer flask, 5.0 g of polyvinyl alcohol (PVA) (Poval PVA 205, manufactured by Kuraray Co., Ltd.) was added to 15.0 g of water and heated to dissolve, and PVA aqueous solution 1 was obtained.

Some of PVA aqueous solution 1 was dried at 100° C. for 2 hours, and when the PVA concentration of PVA aqueous solution 1 was determined from the weight of the PVA after drying and the weight of the dried PVA aqueous solution 1, the PVA concentration was 24.3 wt %.

Production Example 4

Production of VDF-HFP Copolymer Latex 1

In an autoclave, 0.2 parts by mass of sodium hydrogen phosphate ($Na_2HPO_4$) and 330 parts by mass of water were added, and after degassing, 1 part by mass of perfluorooctanoic acid (PFOA) ammonium salt and 0.25 parts by mass of ethyl acetate were added, and 22.7 parts by mass of vinylidene fluoride (VDF) and 14.0 parts by mass of hexafluoropropylene (HFP) were added.

After the temperature was raised to 80° C., 0.06 parts by mass of ammonium persulfate (APS) was added and polymerized, and then another 63.3 parts by mass of VDF was added and polymerized, and when the pressure in the autoclave had dropped to 36% of the ultimate pressure, the polymerization reaction was considered complete, and VDF-HFP copolymer latex 1 (dispersion containing VDF-HFP copolymer particles 1) was obtained.

The resin concentration of the obtained VDF-HFP copolymer latex 1 was 18.8 mass %, and the average particle size of the VDF-HFP copolymer particles was 163.5 nm.

The average particle size of the polymer particles in the dispersions containing polymer particles prepared in the production examples was measured using ELSZ-2 manufactured by Otsuka Electronics Co., Ltd.

Experimental Example 1

To 6.38 g of dispersion containing VDF-HFP copolymer particles 1 prepared in Production Example 4, 3.33 g of the CMC 1.5 wt % aqueous solution prepared in Production Example 1 was added and stirred.

The obtained coating solution was coated onto a separator (NH616, manufactured by Asahi Kasei Co., Ltd.) using a wire bar #4 (wet coated quantity 36 μm) and dried at 100° C. for 10 minutes, and a layer (intermediate layer) formed including VDF-HFP copolymer particles was formed on the separator.

The separator (NH616) is a separator made of polyolefin having a thickness of 16 μm.

The separator on which the intermediate layer was formed was freeze fractured using methanol, and SEM observation was performed.

The obtained SEM photograph is shown in FIG. 1. In FIG. 1, the intermediate layer (left side) was formed on the separator (right side), and it was clearly ascertained that the particles constituting the intermediate layer contacted each other.

Experimental Example 2

To 2.03 g of dispersion containing VDF-HFP copolymer particles 1 prepared in Production Example 4, 0.10 g of the PVA 24.3 wt % aqueous solution prepared in Production Example 3 was added and stirred.

The obtained coating solution was coated onto a separator (NH616, manufactured by Asahi Kasei Co., Ltd.) using a wire bar #4 (wet coated quantity 36 μm) and dried at 100° C. for 10 minutes, and a layer (intermediate layer) formed including VDF-HFP copolymer particles was formed on the separator.

Experimental Example 3

To 6.70 g of dispersion containing VDF-HFP copolymer particles 1 prepared in Production Example 4, 0.54 g of alumina (AKP3000, average particle size 500 nm, manufactured by Sumitomo Chemical Co., Ltd.) and 5.00 g of the CMC 1.5 wt % aqueous solution prepared in Production Example 1 were added and stirred. To 1 g of the obtained solution, another 0.3 g of water was added and stirred.

The obtained coating solution was coated onto a separator (NH616, manufactured by Asahi Kasei Co., Ltd.) using a wire bar #3 (wet coated quantity 24 μm) and dried at 100° C. for 10 minutes, and a layer (intermediate layer) formed including VDF-HFP copolymer particles and alumina particles was formed on the separator.

Comparative Experimental Example 1

To 0.40 g of dispersion containing VDF-HFP copolymer particles 1 prepared in Production Example 4, 5.00 g of the CMC 1.5 wt % aqueous solution prepared in Production Example 1 was added and stirred.

The obtained coating solution was coated onto a separator (NH616, manufactured by Asahi Kasei Co., Ltd.) using a wire bar #8 (wet coated quantity 100 μm) and dried at 100° C. for 10 minutes, and a layer (intermediate layer) formed including VDF-HFP copolymer particles was formed on the separator.

The separator on which the intermediate layer was formed was freeze fractured using methanol, and SEM observation was performed.

Figure 2:
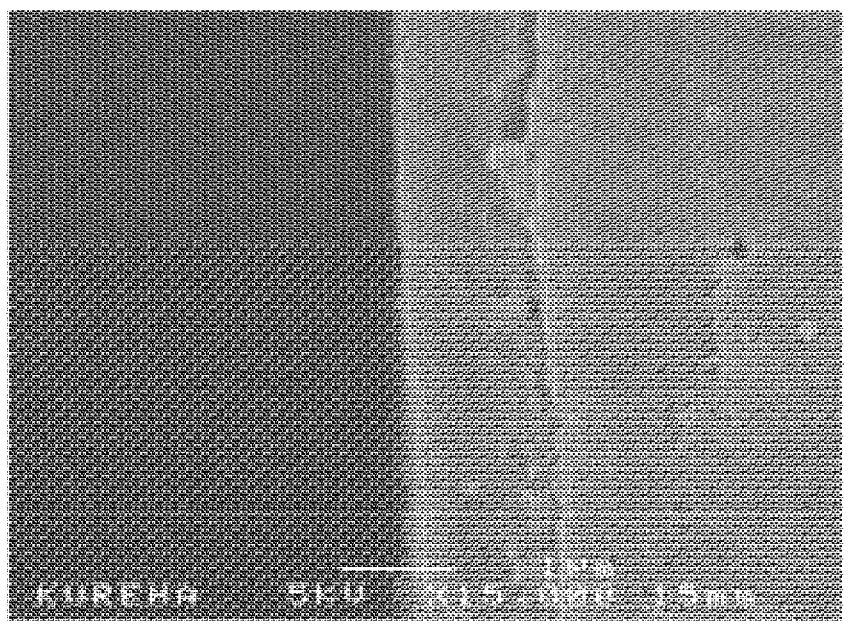
FIG. 2 is an SEM photograph of a cross-section of a separator in which an intermediate layer has been formed, obtained in Comparative Experimental Example 1.

The obtained SEM photograph is shown in FIG. 2. In FIG. 2, the intermediate layer (left side) was formed on the separator (right side), and since the CMC resin was present in a large quantity, it was clearly ascertained that the particles constituting the intermediate layer contacted each other.

Production Example 5

Production of VDF-HFP Copolymer Latex 2

In an autoclave, 0.2 parts by mass of sodium hydrogen phosphate ($Na_2HPO_4$) and 330 parts by mass of water were added, and after degassing, 1 part by mass of perfluorooctanoic acid (PFOA) ammonium salt and 0.25 parts by mass of ethyl acetate were added, and 28.7 parts by mass of vinylidene fluoride (VDF) and 8.0 parts by mass of hexafluoropropylene (HFP) were added.

After the temperature was raised to 80° C., 0.06 parts by mass of ammonium persulfate (APS) was added and polymerized, and then another 63.3 parts by mass of VDF was added and polymerized, and when the pressure in the autoclave had dropped to 41% of the ultimate pressure, the polymerization reaction was considered complete, and VDF-HFP copolymer latex 2 (dispersion 2 containing VDF-HFP copolymer particles) was obtained.

The resin concentration of the obtained VDF-HFP copolymer latex 2 was 20.8 mass %, and the average particle size of the VDF-HFP copolymer particles was 171.3 nm.

Experimental Example 4

To 1.23 g of dispersion containing VDF-HFP copolymer particles 2 prepared in Production Example 5, 1.00 g of the CMC 3.5 wt % aqueous solution prepared in Production Example 2 was added and stirred.

The obtained coating solution was coated onto a separator (NH616, manufactured by Asahi Kasei Co., Ltd.) using a wire bar #3 (wet coated quantity 24 μm) and dried at 100° C. for 10 minutes, and a layer (intermediate layer) formed including VDF-HFP copolymer particles was formed on the separator.

Production Example 6

Production of VDF-HFP Copolymer Latex 3

In an autoclave, 0.2 parts by mass of sodium hydrogen phosphate ($Na_2HPO_4$) and 330 parts by mass of water were added, and after degassing, 0.25 parts by mass of ethyl acetate was added, and 22.7 parts by mass of vinylidene fluoride (VDF) and 14.0 parts by mass of hexafluoropropylene (HFP) were added.

After the temperature was raised to 80° C., 0.06 parts by mass of ammonium persulfate (APS) was added and polymerized, and then another 63.3 parts by mass of VDF was added and polymerized, and when the pressure in the autoclave had dropped to 47% of the ultimate pressure, the polymerization reaction was considered complete, and VDF-HFP copolymer latex 3 (dispersion containing VDF-HFP copolymer particles 3) was obtained.

The resin concentration of the obtained VDF-HFP copolymer latex 3 was 18.3 mass %, and the average particle size of the VDF-HFP copolymer particles was 294.3 nm.

Experimental Example 5

To 1.97 g of dispersion containing VDF-HFP copolymer particles 3 prepared in Production Example 6, 1.00 g of the CMC 1.5 wt % aqueous solution prepared in Production Example 1 was added and stirred.

The obtained coating solution was coated onto a separator (NH616, manufactured by Asahi Kasei Co., Ltd.) using a wire bar #4 (wet coated quantity 36 μm) and dried at 100° C. for 10 minutes, and a layer (intermediate layer) formed including VDF-HFP copolymer particles was formed on the separator.

Production Example 7

Production of VDF Homopolymer Latex 1

In an autoclave, 1 part by mass of sodium hydrogen carbonate ($NaHCO_3$) and 900 parts by mass of water were added, and after degassing, 5 parts by mass of perfluorooctanoic acid (PFOA) ammonium salt and 0.5 parts by mass of ethyl acetate were added, and 100 parts by mass of vinylidene fluoride (VDF) was added.

After the temperature was raised to 80° C., 0.2 parts by mass of ammonium persulfate (APS) was added and polymerized, and when the pressure in the autoclave had dropped to 36% of the ultimate pressure, the polymerization reaction was considered complete, and VDF homopolymer latex 1 (dispersion containing VDF homopolymer particles 1) was obtained.

The resin concentration of the obtained VDF homopolymer latex 1 was 7.5 mass %, and the average particle size of the VDF homopolymer particles was 67.9 nm.

Experimental Example 6

To 10.44 g of dispersion containing VDF homopolymer particles 1 prepared in Production Example 7, 3.33 g of the CMC 1.5 wt % aqueous solution prepared in Production Example 1 was added and stirred.

The obtained coating solution was coated onto a separator (NH616, manufactured by Asahi Kasei Co., Ltd.) using a wire bar #4 (wet coated quantity 36 μm) and dried at 100° C. for 10 minutes, and a layer (intermediate layer) formed including VDF homopolymer particles was formed on the separator.

The air permeability of the laminates in which an intermediate layer was formed on a separator obtained in each of the experimental examples and comparative experimental examples was measured using a Gurley densometer (manufactured by Toyo Seiki Seisaku-sho, Ltd.). The results are shown in Table 1.

Experimental Example 7

The dispersion containing VDF homopolymer particles 1 prepared in Production Example 7 was coated onto thick paper as a separator (echogram paper, 170-8, manufactured by Hokuetsu Kishu Paper Co., Ltd.) using a wire bar #4 (wet coated quantity 36 μm) and dried at 100° C. for 10 minutes, and a layer (intermediate layer) formed including VDF homopolymer particles was formed on the thick paper.

In Experimental Example 7, air permeability was much lower than in other examples because paper was used as the substrate. Even in Experimental Example 7 in which the intermediate layer was formed without using CMC, the intermediate layer did not peel off the thick paper (separator) when the air permeability described below was measured or when the structure was manufactured. That is, it can be seen that in the present invention, use of a water-soluble polymer such as CMC is not mandatory, and the separator is not limited to polyolefin.

The air permeability of the laminates in which an intermediate layer was formed on a separator obtained in each of the experimental examples and comparative experimental examples was measured using a Gurley densometer (manufactured by Toyo Seiki Seisaku-sho, Ltd.). The results are shown in Table 1.

When measured with the same equipment, the air permeability of the separator (NH616) used in the experimental examples was 194.0 sec/100 mL, and the air permeability of the thick paper (echogram paper, 170-8) was 8.1 sec/100 mL.

Working Example 1

Structures comprising an intermediate layer between a separator and an electrode were obtained by sandwiching the laminates on which an intermediate layer was formed on a separator obtained in Experimental Examples 1 to 7 such that the intermediate layer was positioned between the separator and the positive electrode.

TABLE 1

| | Dispersion containing polymer particles | Water-soluble polymer | Inorganic filler | Proportion of polymer particles in solids that form intermediate layer | Intermediate layer thickness [μm] | Air permeability [sec/100 mL] |
|---|---|---|---|---|---|---|
| Experimental Example 1 | Dispersion containing VDF-HFP copolymer particles 1 | CMC (Cellogen 4H) | None | 96 wt % | 3.7 | 294.7 |
| Experimental Example 2 | Dispersion containing VDF-HFP copolymer particles 1 | PVA (PVA205) | None | 94 wt % | 4.0 | 567.8 |
| Experimental Example 3 | Dispersion containing VDF-HFP copolymer particles 1 | CMC (Cellogen 4H) | $Al_2O_3$ (AKP3000) | 67 wt % | 4.5 | 235.7 |
| Comparative Experimental Example 1 | Dispersion containing VDF-HFP copolymer particles 1 | CMC (Cellogen 4H) | None | 50 wt % | 1.5 | Not less than 10,000 |
| Experimental Example 4 | Dispersion containing VDF-HFP copolymer particles 2 | CMC (Cellogen PR) | None | 88 wt % | 3.3 | 261.9 |
| Experimental Example 5 | Dispersion containing VDF-HFP copolymer particles 3 | CMC (Cellogen 4H) | None | 96 wt % | 4.2 | 274.8 |
| Experimental Example 6 | Dispersion containing VDF homopolymer particles 1 | CMC (Cellogen 4H) | None | 94 wt % | 3.3 | 486.1 |
| Experimental Example 7 | Dispersion containing VDF homopolymer particles 1 | None | None | 100 wt % | 8.5 | 8.7 |

Production Example 8

Production of VDF-HFP Copolymer Latex 4

In an autoclave, 0.2 parts by mass of sodium hydrogen phosphate ($Na_2HPO_4$) and 330 parts by mass of water were added, and after degassing, 0.25 parts by mass of ethyl acetate was added, and 26.7 parts by mass of vinylidene fluoride (VDF) and 10.0 parts by mass of hexafluoropropylene (HFP) were added.

After the temperature was raised to 80° C., 0.06 parts by mass of ammonium persulfate (APS) was added and polymerized, and then another 63.3 parts by mass of VDF was added and polymerized, and when the pressure in the autoclave had dropped to 41% of the ultimate pressure, the polymerization reaction was considered complete, and VDF-HFP copolymer latex 4 (dispersion containing VDF-HFP copolymer particles 4) was obtained.

The resin concentration of the obtained VDF-HFP copolymer latex 4 was 21.5 mass %, and the average particle size of the VDF-HFP copolymer particles was 172.7 nm.

Experimental Example 8

To 9.0 g of dispersion containing VDF-HFP copolymer particles 4 prepared in Production Example 8, 9.0 g of CMC 1.2 wt % aqueous solution prepared in the same manner as Production Example 1 and 12.0 g of water were added and stirred.

The obtained coating solution was coated onto a separator (ND420, manufactured by Asahi Kasei Co., Ltd.) using a wire bar #3 (wet coated quantity 24 μm) and dried at 100° C. for 10 minutes, and a layer (intermediate layer) formed including VDF-HFP copolymer particles was formed on the separator. Then, the coating solution was coated in the same manner onto the reverse face of the separator and dried, and a layer (intermediate layer) formed including VDF-HFP copolymer particles was formed on both faces of the separator.

The separator (ND420) is a separator made of polyolefin having a thickness of 20 μm.

The total thickness of the intermediate layers was 1.8 μm. When the air permeability of the laminate in which an intermediate layer was formed on a separator was measured using a Gurley densometer (manufactured by Toyo Seiki Seisaku-sho, Ltd.), the air permeability was 686 sec/100 mL.

Working Example 2

Production of Positive Electrode

An N-methyl-2-pyrrolidone solvent slurry having a solid content concentration of 69 wt % containing lithium cobaltate (CELLSEED C5, manufactured by Nippon Chemical Industrial Co., Ltd.), a conductivity promoter (SuperP, manufactured by TIMCAL), and PVDF (polyvinylidene fluoride) (KF#1100, manufactured by Kureha Corporation) in a weight ratio of 93:3:4 was created. After it was coated onto Al foil using a 115-μm spacer, it was dried at 120° C.

for 3 hours and then pressed to produce a positive electrode having a bulk density of 3.6 g/cm$^3$ and a weight per unit area of 150 g/m$^2$.

Production of Negative Electrode

An aqueous solvent slurry having a solid content concentration of 53 wt % containing BTR918 (modified natural graphite, manufactured by BTR Energy Materials Co., Ltd.), a conductivity promoter (SuperP, manufactured by TIMCAL), SBR (styrene butadiene rubber latex BM-400, manufactured by Nippon Zeon Corporation), and CMC (carboxymethyl cellulose Cellogen 4H, manufactured by manufactured by Dai-ichi Kogyo Seiyaku Co., Ltd.) in a weight ratio of 90:2:3:1 was created. After it was coated onto Cu foil using a 90-μm spacer, it was dried at 120° C. for 3 hours and then pressed to produce a negative electrode having a bulk density of 1.5 g/cm$^3$ and a weight per unit area of 56 g/m$^2$.

Measurement of Peel Strength of Battery (Laminated Cell)
Production of Sample for Peel Strength Measurement and Measurement of Peel Strength The positive electrode and negative electrode were cut to 2.5×5.0 cm and the separator on which an intermediate layer was formed manufactured in Experimental Example 8, was cut to 3.0×6.0 cm, and they were joined. The produced piece was immersed in an electrolyte (ethylene carbonate (EC): dimethyl carbonate (DMC):ethylmethyl carbonate (EMC) =1:2:2 vol, Li 1.3 mol/L), and then degassed and sealed by vacuum in an aluminum pouch using a vacuum sealer. Then, by hot pressing using a hot press (electrode weighted at 20 kg/cm$^2$, temperature 90° C., for 1 minute after 3 minutes of preheating), an Al laminated cell (sample for peel strength measurement) was obtained.

The peel strength between the separator on which the intermediate layer was formed and the positive electrode was measured by fixing the positive electrode and pulling the separator at an angle of 180° C. using a TENSILON Universal Tester (manufactured by A&D Co., Ltd.).

The peel strength between the separator on which the intermediate layer was formed manufactured in Experimental Example 8 and the positive electrode was 1.6 gf/mm. It was demonstrated that a separator that does not have an intermediate layer can be adhered to a positive electrode by providing an intermediate layer.

Cycle Test of Battery (Laminated Cell)
Production of Battery and Cycle Test

The positive electrode was cut to 5×5 cm, the negative electrode was cut to 5.5×11 cm, and the separator on which an intermediate layer was formed manufactured in Experimental Example 8 was cut to 6×12 cm, and they were joined. The produced piece was immersed in an electrolyte (EC: DMC:EMC=1:2:2 vol, Li 1.3 mol/L), and then degassed and sealed by vacuum in an aluminum pouch using a vacuum sealer. Then, by hot pressing using a hot press (electrode weighted at 20 kg/cm$^2$, temperature 90° C., for 1 minute after 3 minutes of preheating), an Al laminated cell was obtained.

For the obtained Al laminated cell, three cycles of charge-discharge cycles including constant current constant voltage charging (charging conditions: 0.1 C and 4.2 V) and cut-off constant current discharging (discharging conditions: 0.1 C and 3 V) were performed, and then 100 cycles of charge-discharge cycles including constant current constant voltage charging (charging conditions: 1 C and 4.2 V) and cut-off constant current discharging (discharging conditions: 1 C and 3 V) were performed.

Figure 3:
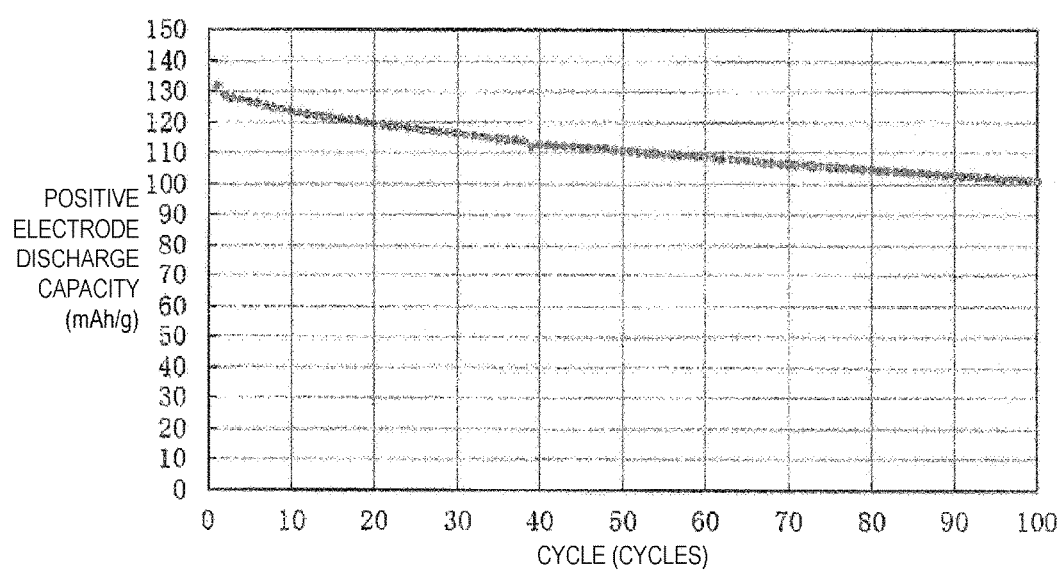
FIG. 3 is a figure illustrating the positive electrode discharge capacity in a cycle test of a laminated cell performed in Working Example 2.

The change in positive electrode discharge capacity is illustrated in FIG. 3.

It was ascertained that the laminated cell that used the separator on which an intermediate layer was formed manufactured in Experimental Example 8 works as a secondary battery.

The invention claimed is:

1. A structure for a non-aqueous electrolyte secondary battery comprising:
   a positive electrode, in which a positive electrode mixture layer containing a positive electrode active material is formed on a positive electrode current collector;
   a negative electrode, in which a negative electrode mixture layer containing a negative electrode active material is formed on a negative electrode current collector;
   a separator provided between the positive electrode and the negative electrode; and
   an intermediate layer being provided between the positive electrode mixture layer and the separator and/or between the negative electrode mixture layer and the separator, the intermediate layer being formed from an aqueous dispersion containing particles of a copolymer of vinylidene fluoride and hexafluoropropylene, and the intermediate layer containing the particles, the particles constituting 99.99 to 80 parts by mass per 100 parts by mass of raw materials that constitute the intermediate layer, wherein the intermediate layer further comprises a water-soluble polymer and has a structure in which a plurality of the particles are mutually joined directly or via the water-soluble polymer, the water-soluble polymer is contained in an amount from 0.01 to 20 parts by mass per 100 parts by mass of raw materials that constitute the intermediate layer.

2. The structure for a non-aqueous electrolyte secondary battery according to claim 1, wherein an average particle size of the particles is from 10 to 700 nm.

3. The structure for a non-aqueous electrolyte secondary battery according to claim 1, wherein the intermediate layer is provided between the positive electrode and the separator.

4. A non-aqueous electrolyte secondary battery comprising the structure for a non-aqueous electrolyte secondary battery described in claim 1.

5. The structure for a non-aqueous electrolyte secondary battery according to claim 1, wherein the water-soluble polymer comprises carboxymethyl cellulose (CMC), polyacrylic acid (PAA), polyvinylpyrrolidone (PVP), polyvinyl alcohol (PVA), or polyethylene oxide (PEO).

6. The structure for a non-aqueous electrolyte secondary battery according to claim 1, wherein the water-soluble polymer comprises carboxymethyl cellulose (CMC) or polyvinyl alcohol (PVA).

* * * * *